United States Patent [19]
Webber

[11] Patent Number: 5,177,393
[45] Date of Patent: Jan. 5, 1993

[54] OPTICALLY COMMUTATED DC MOTOR

[76] Inventor: Gary Webber, 225 Norwood St., Sharon, Mass. 02067

[21] Appl. No.: 764,536

[22] Filed: Sep. 24, 1991

[51] Int. Cl.⁵ .................. H02K 11/00; H02P 5/06; H02P 6/00; H02P 7/06
[52] U.S. Cl. .................. 310/68 B; 318/254; 318/480
[58] Field of Search .................. 310/68 R, 68 B; 318/254, 480, 640, 659, 660, 661; 250/231.13, 231.15

[56] References Cited

U.S. PATENT DOCUMENTS

| | | | |
|---|---|---|---|
| 3,257,594 | 6/1966 | Weigel | 318/138 |
| 3,577,053 | 5/1971 | McGee | 318/254 |
| 4,008,425 | 2/1977 | Dickey | 318/254 |
| 4,224,515 | 9/1980 | Terrell | 318/640 |
| 5,021,735 | 6/1991 | Maas et al. | 318/640 |

FOREIGN PATENT DOCUMENTS

| | | | |
|---|---|---|---|
| 2726948 | 1/1979 | Fed. Rep. of Germany | 310/68 R |
| 2454722 | 12/1980 | France | 318/254 |
| 0091683 | 6/1982 | Japan | 318/254 |
| 0614077 | 10/1979 | Switzerland | 318/254 |

Primary Examiner—Steven L. Stephan
Assistant Examiner—C. LaBalle
Attorney, Agent, or Firm—Pandiscio & Pandiscio

[57] ABSTRACT

An optically commutated dc motor which includes an optically encoded disk mounted on the permanent magnet rotor shaft and the encoding consists of a repeated graphics representation of the desired stator-field force strength. Optical detectors are employed to create an opto-electrical signal of sinusoidal form which is amplified and placed across the stator windings.

2 Claims, 9 Drawing Sheets

("FORWARD")

("REVERSE")

("FORWARD")

("REVERSE")

OPTICALLY COMMUTATED DC MOTOR

FIELD OF THE INVENTION

This invention relates to brushless dc motors and, more particularly, to a method and means for optically commutating dc motors.

BACKGROUND OF THE INVENTION

Direct current (dc) motors produce mechanical torque from a direct current or non-varying electrical current source. It is advantageous to employ a dc motor in many applications since it is not necessary to go through the step of converting the output of available portable dc power sources, such as electrochemical batteries, fuel cells or solar cells, to provide an input suitable for running a more highly efficient ac motor.

Various electro-mechanical arrangements have been proposed for switching constant direct current to produce mechanical torque. For example, in the case of automotive starter motors, an electro-mechanical arrangement is employed which switches the direction of current through a "rotor" coil on a moving rotor as it is rotated through a "stator" magnetic field. The rotating coil produces a rotor-position-varying magnetic field, i.e., flux vector, which interacts with the constant stator magnetic field to produce torque. The arrangement for switching constant dc to produce a rotational-varying flux vector is commonly termed "commutation" of a dc motor. This is typically accomplished by a pair of switches being in contact with the rotor to switch polarity of the rotor magnetic field to insure that the rotor is continuously attracted in the same direction. This can be a source of trouble in purely electro-mechanical motors, however, since often stationary mechanical parts are abraded by moving parts, and because electrical current flowing across the junction frequently produces accumulations of dirt, oxidation, and electrical noise due to arcing.

A more satisfactory system for commutation was developed when a permanent magnet was placed on the rotor of the dc motor and, by various electronic means, a time or rotational varying magnetic field was created in the stator coils. Thus, small permanent magnet rotor motors have been available which are more efficient than the prior electro-mechanical versions due to lower magnetic losses. Such permanent magnet dc motors have been referred to as "stepper" motors because the field coils are stepped through a sequence of discrete flux steps to cause the rotor to shift to discrete shaft positions. By employing a network of appropriate electronic "switches", a sequence of "steps" are produced to move the shaft of the motor. Although such a "stepper" approach is adequate for discrete precision positioning, it obviously is unacceptable where smooth torque generation is desired, since the discrete steps which are created by such a system will produce "cogging", or torque variation with respect to time, unless a critical "tuning" of the mechanical system is performed for each step motion.

Sequential energization of the driving coils of a brushless dc motor in response to the angular position of the rotor has been proposed in U.S. Pat. No. 3,900,780 issued to Tanikoshi on Aug. 19, 1975, wherein a light-shielding disk mounted coaxially with the rotary magnet is employed together with light sensors to create energization signals; and also in U.S. Pat. No. 4,525,657 issued to Nakase et. al. on Jun. 25, 1985, wherein a rotary encoder disk is fixed to the rotor magnet shaft and is provided with a series of slits to create a series of pulsed signals which are used to energize the stator coils. The use of optically encoded wheels which are secured to the rotor of a brushless dc motor in order to sense the rotor position, and for utilizing the signal obtained from such sensors to control the energization of specific windings of the stator such that a rotating electromagnetic field is provided in synchronization with the rotation of the magnetic poles of the rotor, is further suggested in U.S. Pat. No. 4,353,016, issued on Oct. 5, 1982 to Born. In the Born device, the code wheel is a multi-sector disk which has as many optically detectable transitions as there are magnetic poles. Born processes the resulting square waves from the sensors through a filter network to provide sinusoidal motor drive signals which continuously modulate motor winding currents to provide linear speed control.

Such prior art devices all employ involved circuitry for converting square wave pulsed signals into appropriate signals which are then fed to the stator windings to insure movement of the rotor. There is no suggestion of employing an optically encoded disk which creates a signal which is itself sinusoidal, and which only requires linear amplification in order to provide power to the stator coils in a rotor position-related sequence.

A more recent suggestion for improvement of brushless dc motor technology involves feeding the position of the rotor shaft to a microcomputer and then energizing the stator coils in a digitally synthesized sinusoidal manner to produce smooth torque. However, such a system is subject to problems such as high electro-magnetic fields which may be caused by lightning strikes, and also errors which may be introduced by program designers.

Still other art relating to the present invention is described and illustrated in U.S. Pat. No. 3,883,785 issued to Fulcher et al. on May 13, 1975; U.S. Pat. No. 4,463,291 issued to Usry on Jul. 31, 1984; U.S. Pat. No. 4,717,864 issued to Fultz on Jan. 5, 1988; and U.S. Pat. No. 4,899,093 issued to Gleim on Feb. 6, 1990.

OBJECTS OF THE INVENTION

One object of the present invention is to provide an optical disk commutating system for a brushless dc motor which will provide continuous sinusoidal signals to energize the stator coils of the motor.

Another object of the present invention is to provide an optical disk for use in a commutating system for a brushless dc motor which is encoded in a manner so as to ensure that sinusoidal signals are generated representative of the rotor position for energizing the stator coils of the motor.

Yet another object of the present invention is to provide a new optically commutated dc motor.

Still another object of the present invention is to provide a new method for operating a dc motor.

And another object of the present invention is to provide a dc motor which is simple and inexpensive to manufacture, and which provides smooth output torque.

SUMMARY OF THE INVENTION

To accomplish the foregoing objectives, the optically commutated dc motor of the present invention involves placing desired stator-field force strength information on a optically detectable surface which is mechanically coupled to the rotor carrying the electro-magnetic element, and then reading the surface with detectors to create opto-electrical signals which are then linearly amplified and placed directly across the stator windings of the motor.

BRIEF DESCRIPTION OF THE DRAWINGS

Still other objects and features of the present invention will be more fully disclosed or rendered obvious by the following detailed description of the invention, which is to be considered together with the accompanying drawings wherein like figures refer to like parts and further wherein.

DETAILED DESCRIPTION OF THE INVENTION

Figure 1:
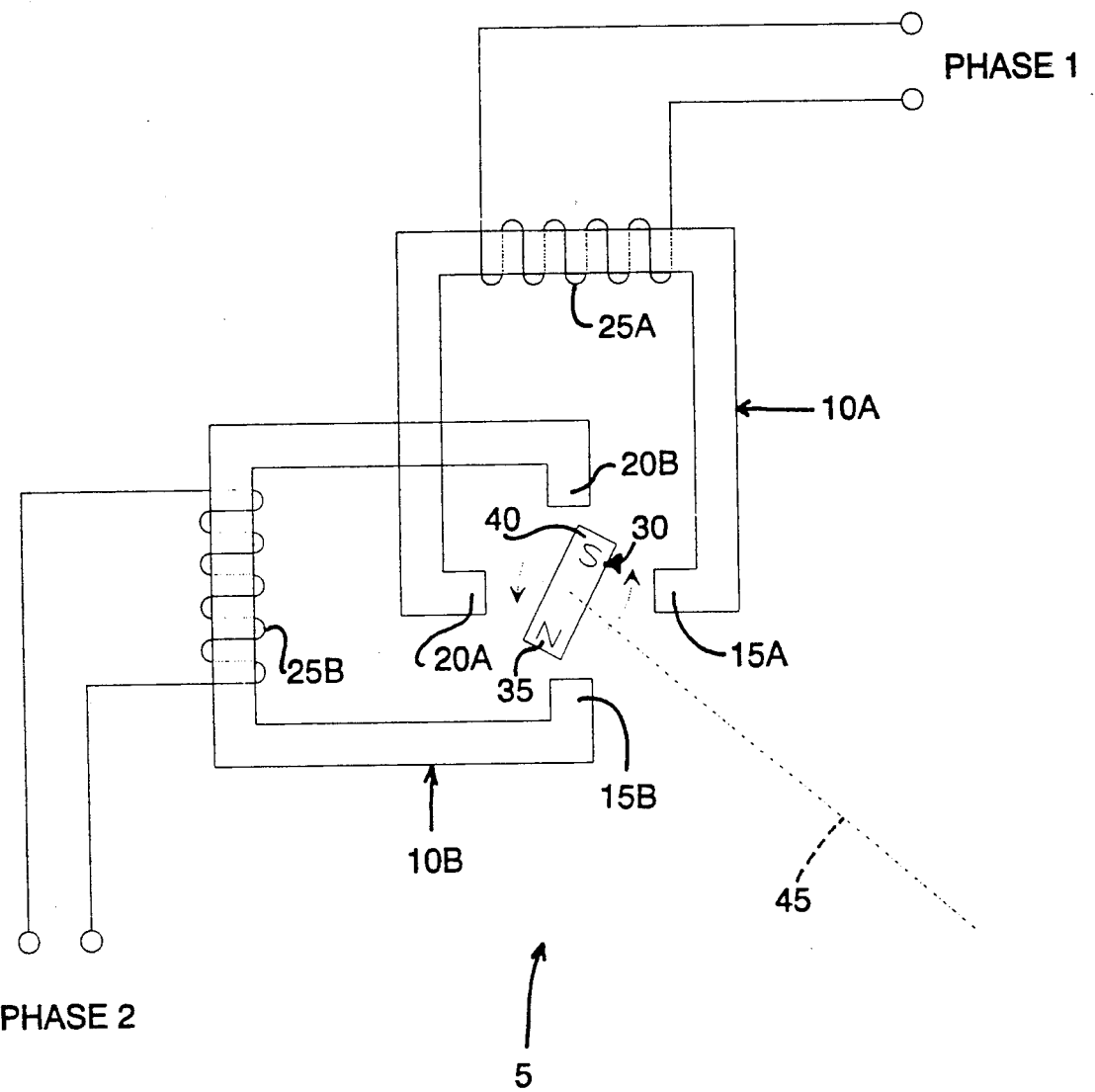
FIG. 1 is a schematic representation of a conventional dc stepper motor.

Looking first to FIG. 1, there is shown a conventional dc stepper motor 5. Stepper motor 5 generally comprises at least two stator assemblies 10A, 10B, each of which comprises a first pole 15A, 15B and a second pole 20A, 20B. Coils 25A, 25B energize stator assemblies 10A, 10B, respectively. A rotor 30 comprising at least one permanent magnet having a North pole 35 and a South pole 40 is rotatably mounted on an output shaft 45, whereby rotor poles 35 and 40 can rotate past stator poles 15A, 15B, 20A and 20B. By appropriately sequencing, in ways well known in the art, the Phase 1 and Phase 2 currents run through coils 25A, 25B, respectively, rotor 30 can be made to rotate past the various stator poles so as to provide output torque on shaft 45.

Figure 2:
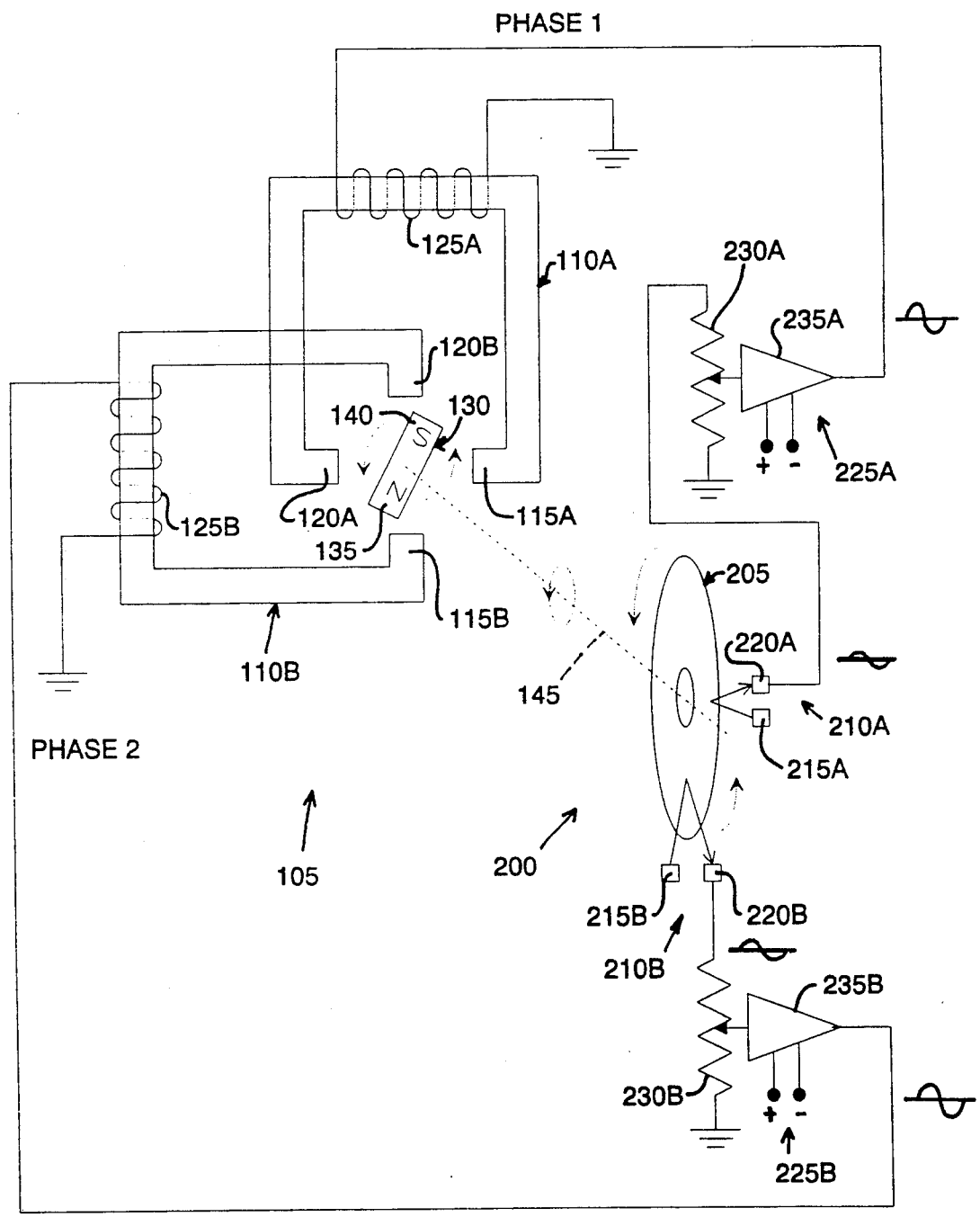
FIG. 2 is a schematic representation of a new dc stepper motor formed in accordance with the present invention and having associated optical commutation means.

Looking next at FIG. 2, there is shown an optically commutated dc motor 105 made in accordance with the present invention. Motor 105 is identical to the motor 5 previously described, except to the extent that will hereinafter be described. More specifically, motor 105 also comprises at least two stator assemblies 110A, 110B, each of which comprises a first pole 115A, 115B and a second pole 120A, 120B. Coils 125A, 125B energize stator assemblies 110A, 110B, respectively. A rotor 130 comprising at least one permanent magnet having a North pole 135 and a South pole 140 is rotatably mounted on an output shaft 145, whereby rotor poles 135 and 140 can rotate past stator poles 115A, 115B, 120A and 120B.

To the foregoing extent, motor 105 is identical to the motor 5 previously described.

Motor 105 also comprises novel optical commutation means 200 for appropriately energizing coils 125A, 125B, respectively, so as to cause rotor 130 to rotate past the various stator poles and thereby provide output torque on shaft 145. More specifically, optical commutation means 200 comprises an optically encoded wheel or disk 205 which is mounted on shaft 145 so as to rotate therewith. Optical commutation means 200 also comprises at least two light source/light sensor assemblies 210A, 210B, wherein each light source/light sensor assembly comprises a light source 215A, 215B and a light sensor 220A, 220B. Each of the light sources 215A, 215B is adapted to continuously shine a light beam onto disk 205, and each of the light sensors 220A, 220B is adapted to receive a corresponding reflected light beam off disk 205 and to produce a corresponding output signal whose voltage varies in direct proportion to the level of the reflected light beam coming off disk 205.

The output of light sensors 220A, 220B is fed to amplification circuits 225A, 225B, respectively. More specifically, each of the amplification circuits 225A, 225B comprises a potentiometer 230A, 230B and a power amplifier 235A, 235B. The output of light sensors 220A, 220B are connected to the inputs of potentiometers 230A, 230B, respectively, and the picks of the potentiometers 230A, 230B are connected to the inputs of power amplifiers 235A, 235B, respectively. The output of power amplifiers 235A, 235B are connected directly to the coils 125A, 125B, respectively.

Alternatively, potentiometers 230A, 230B could be replaced with equivalent variable gain devices of the sort well known in the art. The important point to be noted with respect to potentiometers 230A, 230B (or their equivalent variable gain device replacements) is that some means be provided between the outputs of light sensors 220A, 220B and the inputs of power amplifiers 235A, 235B which permit the amplitudes of the sinusoidal signals output by light sensors 220A, 220B to be adjusted before being fed into the inputs of power amplifiers 235A, 235B.

Thus it will be seen that the output signals provided by light sensors 220A, 220B are linearly amplified and then directly used to power the coils 125A, 125B, respectively.

Figure 3:
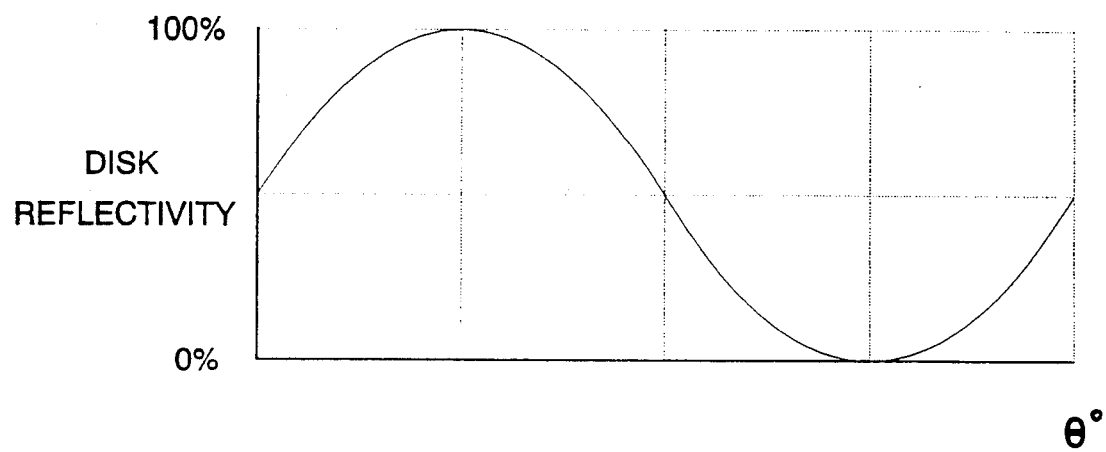
FIG. 3 is a graph showing the relative reflectivity of the optical commutator disk about its angle of rotation.
Figure 4:
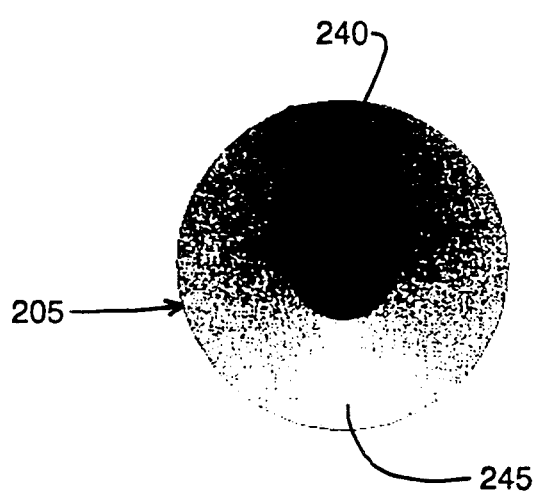
FIG. 4 is a side view in elevation showing one embodiment of the optical commutator disk.

Looking next at FIGS. 2, 3 and 4, disk 205 is variably coated on at least one side thereof with a highly reflective material, whereby the disk will variably reflect the light generated by light sources 215A, 215B according to the amount of reflective material present at the point of light incidence. More particularly, disk 205 is variably coated with a highly reflective material whose surface area coverage progressively increases and then decreases through the angle of rotation of the disk, in a substantially continuous manner, such that the disk's reflectivity will vary in a substantially sinusoidal manner.

As a result of the foregoing construction, when light from the light sources 215A, 215B shines on disk 205 and the disk is then rotated, the light sensors 220A, 220B will receive sinusoidally-varying amounts of reflected light from the disk, so that light sensors 220A, 220B will provide sinusoidally-varying output signals to the inputs of power amplifiers 235A, 235B, respectively. As a result, power amplifiers 235A, 235B will power coils 125A, 125B with sinusoidally-varying currents so that rotor 130 can be made to smoothly rotate past the various stator poles without "stepping" and so as to provide a smooth output torque on shaft 145.

It will be appreciated that the number of light source/light sensor assemblies 210A, 210B, and the number of amplification circuits 225A, 225B, must be coordinated with the number of stator assemblies 110A, 110B and the number of coils 125A, 125B, so that a light source/light sensor assembly and a corresponding amplification circuit will be provided for each stator assembly and coil.

In addition, it will also be appreciated that the reflective pattern on disk 205 must be coordinated with the number and position of light source/light sensor assemblies 210A, 210B, so that the motor's stator assemblies 110A, 110B will be powered in a coordinated fashion so as to cause rotor 130 to be rotated amongst the energized stator assemblies. In essence, disk 205 must be patterned, and the light source/light sensor assemblies 210A, 210B positioned, so that stator poles 115A, 115B, 120A and 120B are successively energized by sinusoidally-varying Phase 1 and Phase 2 currents so as to create the magnetic fields necessary to drive rotor 130.

Figure 5:
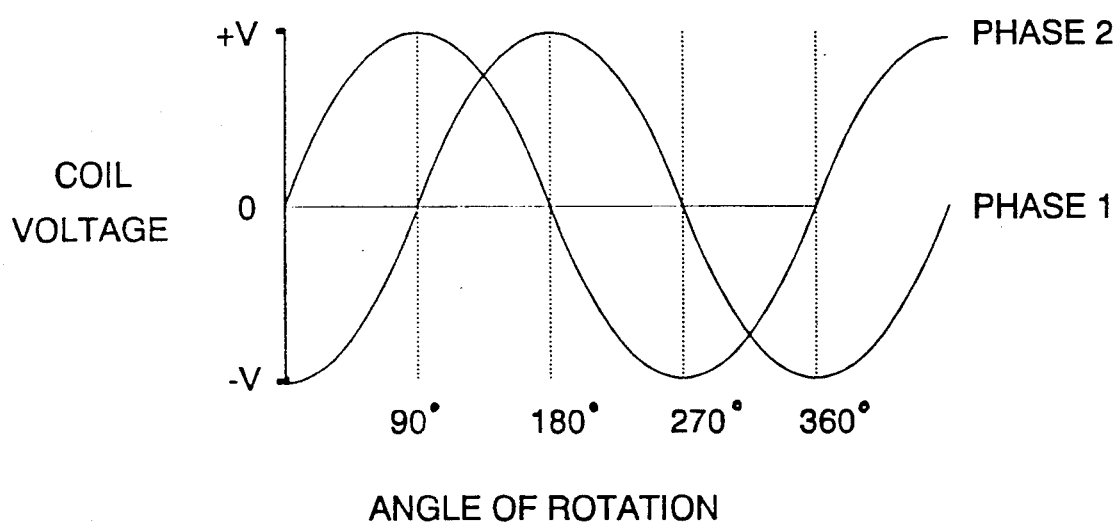
FIG. 5 is a graph showing the nature and phase relationships of the respective coil voltages for the dc motor shown in FIG. 2.

By way of example, in the case such as that exemplified in FIG. 2 wherein two stator assemblies 110A, 110B are provided, set at 90 degree angles relative to one another, and a single magnet is mounted on rotor 130, the power gradients of the Phase 1 and Phase 2 currents supplied to coils 125A, 125B must be smooth sinusoidal slopes set at the appropriate phase to one another so that the principal driving magnetic flux vector created by the stator assemblies always leads the rotor position by 90 degrees to provide proper torque on the shaft. To this end, for the motor apparatus illustrated in FIG. 2 having two stator assemblies 110A, 110B set at a 90 degree angle relative to one another, and a single magnet mounted on rotor 130, the two light source/light sensor assemblies 210A, 210B should be set at a 90 degree angle relative to one another about the angle of rotation of disk 205, and disk 205 should be provided with a region of maximum reflectivity 240 and a region of minimum reflectivity 245, wherein the region of maximum reflectivity 240 is diametrically opposed to the region of minimum reflectivity 245, and wherein the degree of reflectivity varies sinusoidally around the disk in the manner shown in FIG. 4. As a result of the foregoing construction, the power delivered to coils 125A, 125B will vary sinusoidally according to the angular position of rotor 130, in the phase relationship illustrated in FIG. 5 wherein the sinusoidal Phase 1 current will lead the sinusoidal Phase 2 current by a 90 degree angle.

On account of the foregoing, it will be appreciated that when the motor 105 shown in FIGS. 2-5 is operated, its rotor 130 will impart a smooth torque on its output shaft 145.

Furthermore, it will be appreciated that the amount of torque produced on output shaft 145 of motor 105 may be controlled, or "throttled", by coordinating the relative positioning of the picks coming off potentiometers 230A, 230B. More specifically, it will be seen that motor 105 will produce maximum torque when potentiometers 230A, 230B are set to provide minimum resistance, and motor 105 will produce minimum torque when potentiometers 230A, 230B are set to provide maximum resistance. Of course, it is important that the relative positioning of the picks coming off potentiometers 230A, 230B be coordinated with one another so that the Phase 1 and Phase 2 currents have related amplitudes. Alternatively, in the event that potentiometers 230A, 230B are replaced by equivalent variable gain devices of the sort well known in the art, it will be appreciated that motor 105 will provide maximum torque when the replacement variable gain devices are set to provide maximum gain, and motor 105 will produce minimum torque when the replacement variable gain devices are set to provide minimum gain. Furthermore, the replacement variable gain devices will provide a means of balancing the amplitudes of the Phase 1 and Phase 2 currents relative to one another, so as to provide smooth drive to rotor 30.

Of course, certain changes may be made to the embodiment shown in FIGS. 2-5 without departing from the scope of the present invention.

Figure 6:
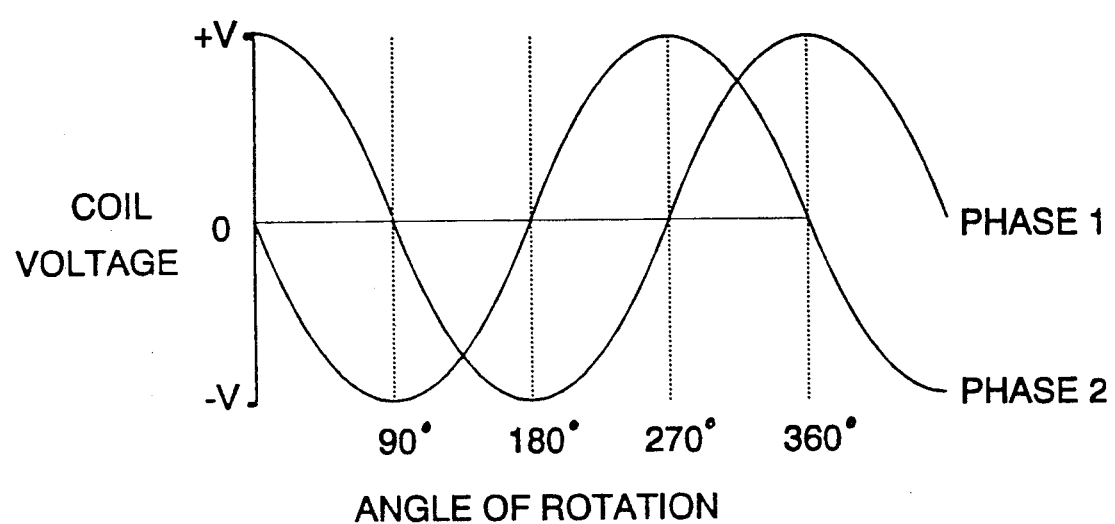
FIG. 6 is a graph showing the nature and phase relationships of the respective coil voltages for the same dc motor, after the motor has been modified to drive its output shaft in a second, or "reverse", direction.

Thus, for example, it will be appreciated that with the motor embodiment shown in FIGS. 2-5, output shaft 145 will rotate in a first, or "forward" direction. However, by modifying the apparatus so that the respective coil voltages for the dc motor have the relationship shown in FIG. 6, the output shaft 145 will rotate in the opposite, or "reverse", direction. Such a result may be achieved by varying the positions of light source/light sensor assemblies 210A, 210B relative to one another and relative to disk 205, or by other ways which will be obvious to persons skilled in the art.

Figure 7:
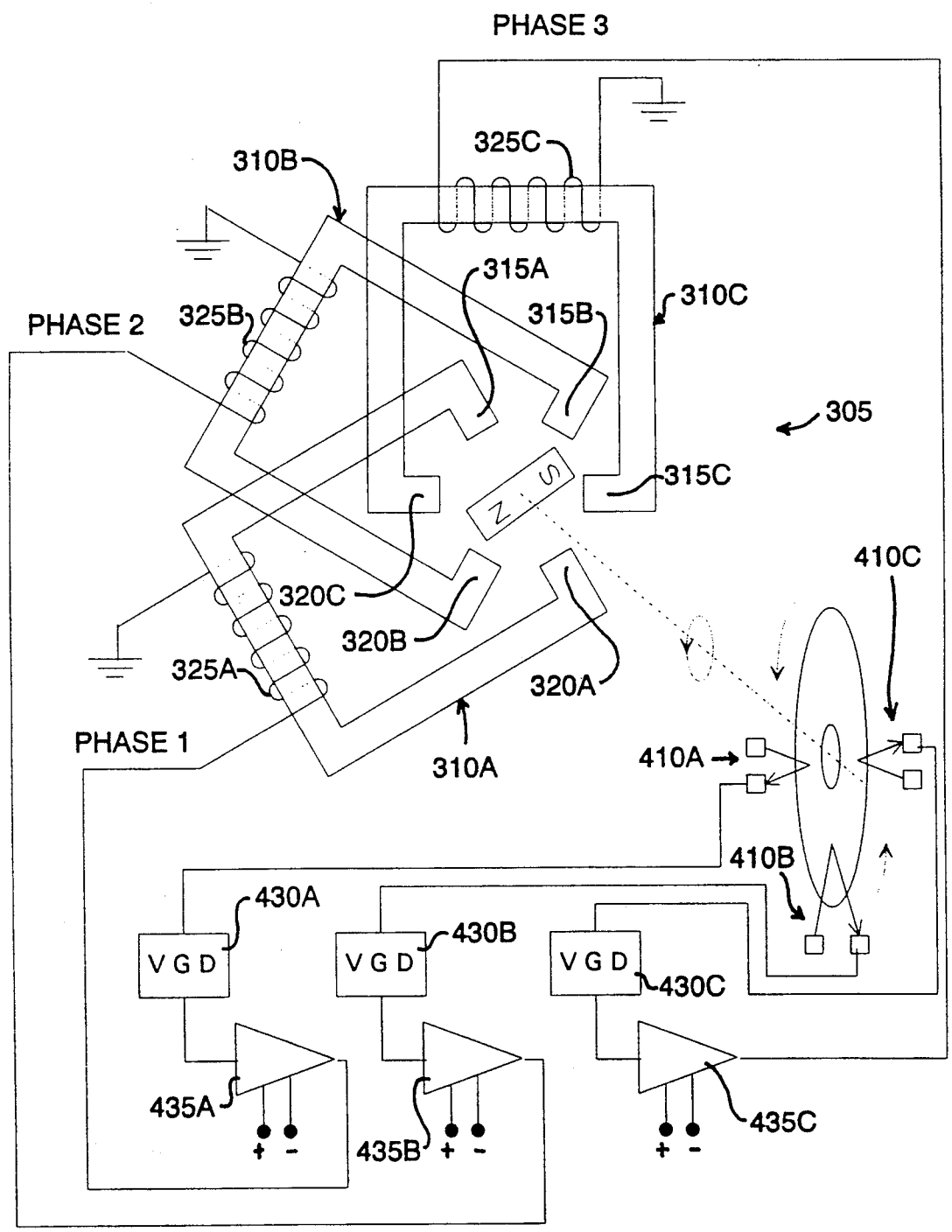
FIG. 7 is a schematic representation showing an alternative form of dc motor formed in accordance with the present invention.
Figure 8:
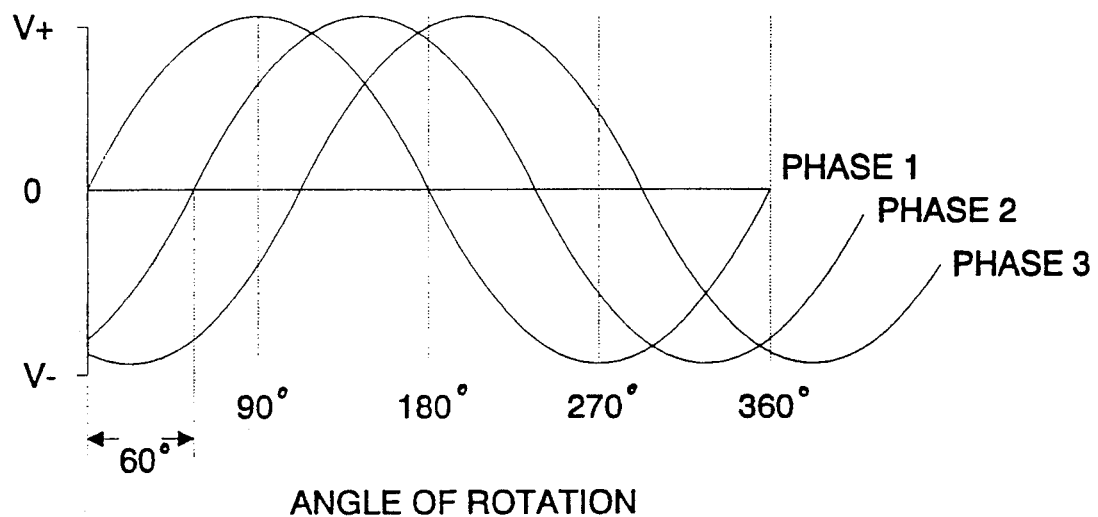
FIG. 8 is a graph showing the nature and phase relationships of the respective coil voltages for the dc motor shown in FIG. 7, wherein the motor is adapted to run in a first, or "forward", direction.
Figure 9:
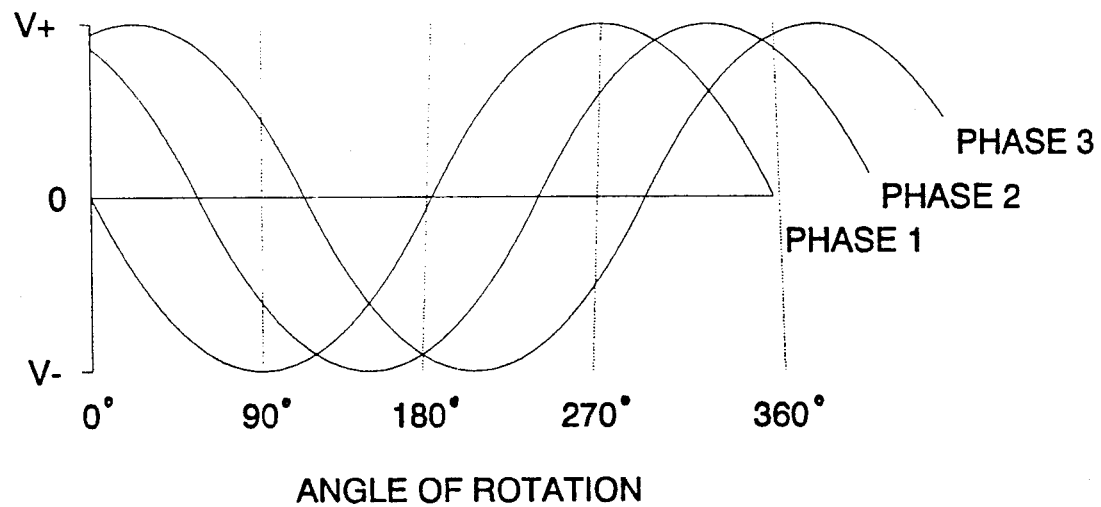
FIG. 9 is a graph showing the nature and phase relationships of the respective coil voltages for the dc motor shown in FIG. 7, wherein the motor is adapted to run in the opposite, or "reverse", direction.

Furthermore, more than two stator assemblies 110A, 110B may be provided, e.g. four stator assemblies may be provided. Of course, for each such stator assembly provided, a corresponding light source/light sensor assembly and a corresponding amplification circuit must be provided; in addition, the reflective pattern formed on disk 205 must be appropriately fashioned for the construction being used. Thus, for example, and looking now at FIGS. 7 and 8, there is shown an motor 305 that comprises three stator assemblies 310A, 310B, 310C, each of which comprises a first pole 315A, 315B, 315C and a second pole 320A, 320B, 320C. Coils 325A, 325B, 325C energize stator assemblies 310A, 310B, 320C, respectively. Three light source/light sensor assemblies 410A, 410B, 410C are also provided. The outputs from light source/light sensor assemblies 10A, 410B, 410C are fed into the inputs of variable gain devices 30A, 430B, 430C, respectively, and the outputs of variable gain devices 430A, 430B, 430C are fed into the inputs of power amplifiers 435A, 435B, 435C, respectively. The outputs of power amplifiers 435A, 435B, 435C are connected directly to the coils 25A, 325B, 325C, respectively. FIG. 8 shows the phase relationships between the Phase 1, Phase 2 and Phase 3 currents used to power motor 305 in a first, or "forward", direction. FIG. 9 shows the phase relationships between the Phase 1, Phase 2 and Phase 3 currents used to power motor 305 in the opposite, or "reverse", direction.

Furthermore, more than one permanent magnet may be positioned on rotor 130.

In addition, it should be appreciated that disk 205 can have more than one region of maximum reflectivity 240, more than one region of minimum reflectivity 245, and can be coated on both sides if desired. Furthermore, more than one disk 205 can be positioned on shaft 145.

Also, step-up or step-down gearing mechanisms could be interposed between disk 205 and shaft 145, so that the rotation of the disk could be something other than a 1:1 function of the rotation of the shaft.

Figure 10:
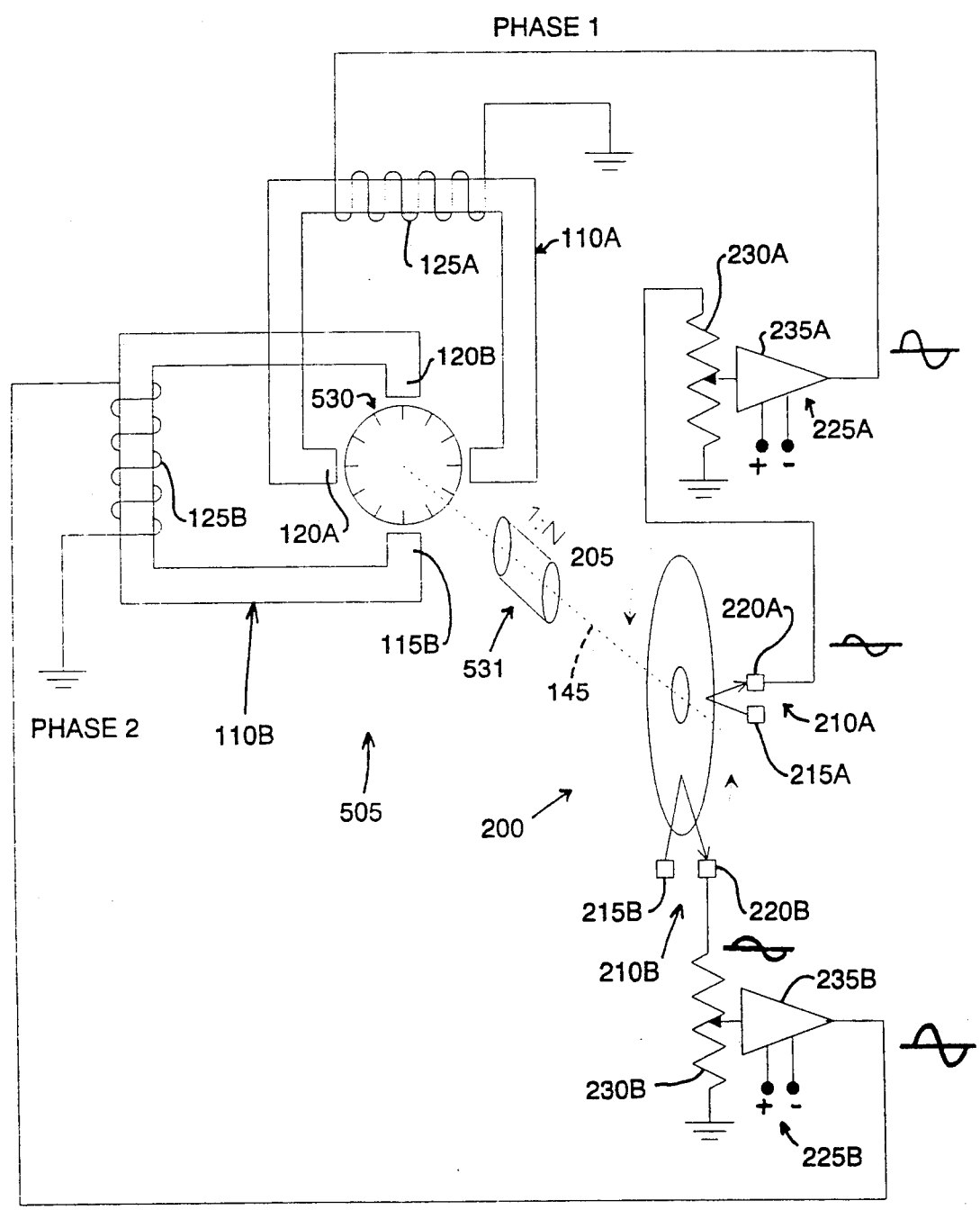
FIG. 10 is a schematic representation showing another form of dc motor formed in accordance with the present invention.

Thus, for example, FIG. 10 illustrates a motor 505 which is substantially the same as the motor 105 disclosed in FIG. 2, except that the single magnet rotor 30 has been replaced by a multiple magnet rotor 530, and a step-up gearing mechanism 531 has been interposed between rotor 530 and disk 205, whereby a given degree of rotation of rotor 530 will result in a greater, yet related, degree of rotation of disk 205.

Figure 11:
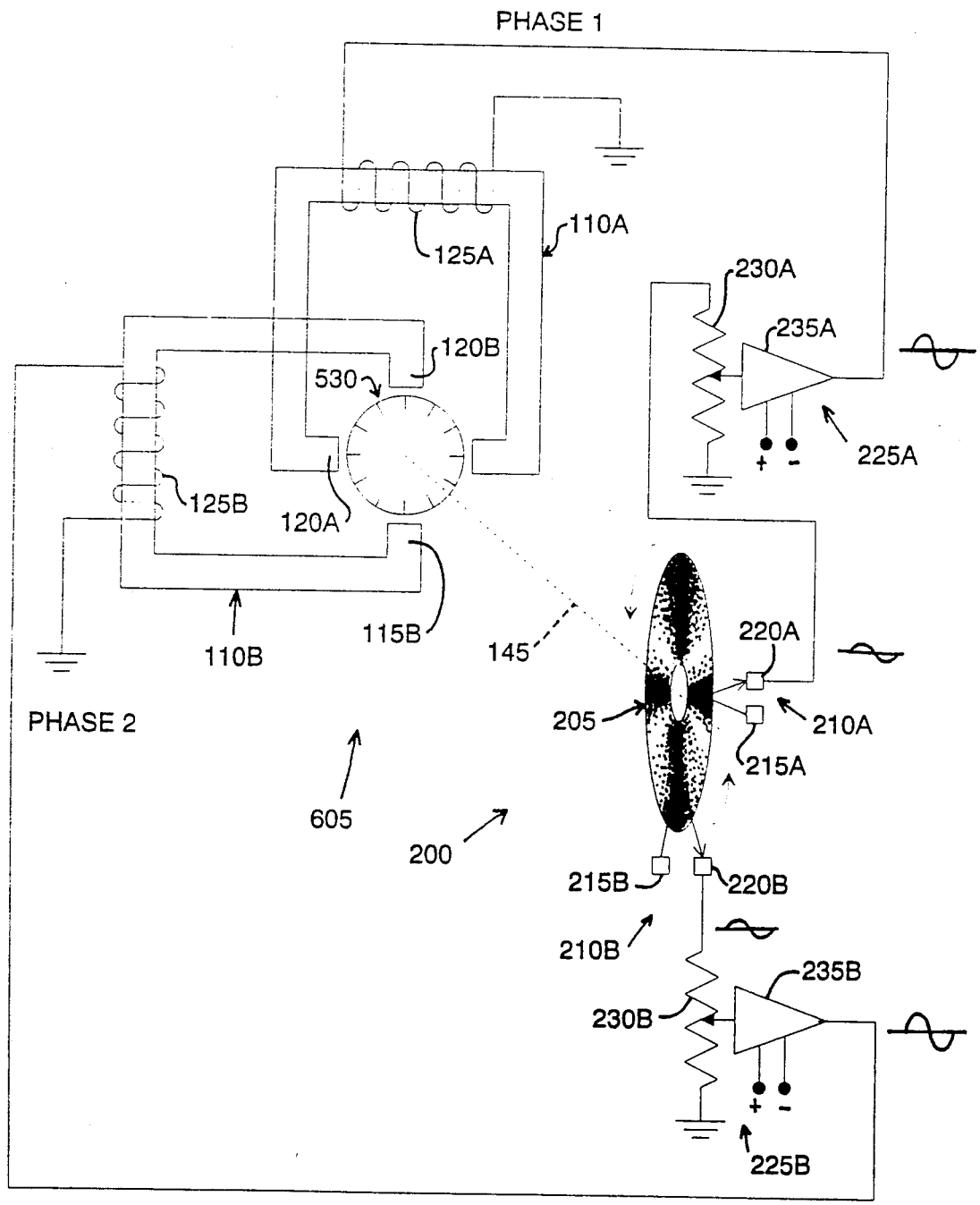
FIG. 11 is a schematic representation showing yet another form of dc motor formed in accordance with the present invention.

By way of further example, FIG. 11 illustrates a motor 605 which is substantially the same as the motor 105 disclosed in FIG. 2, except that the single magnet rotor 30 has been replaced by a multiple magnet rotor 530, and the single cycle density pattern on disk 205 (FIGS. 2 and 4) has been replaced by a multiple cycle density pattern on disk 605.

Furthermore, it is also envisioned that the present invention could be employed with electric motors of the sort comprising a non-magnetized ferrous rotor, wherein the rotor will move to align itself in a magnetic stator field generated by the motor.

It is also anticipated that disk 205 could be replaced with a cylinder or drum or the like, wherein the exterior surface of the cylinder or drum is variably coated with a highly reflective material, in a manner analogous to that done with disk 205.

What is claimed is:

1. A commutating system for a brushless dc motor, said system comprising:

a multiple magnet rotor mounted to a first shaft for rotation thereon, said multiple magnet rotor comprising an alternating North-South pole configuration;

a plurality of stators each comprising two poles and an associated winding disposed about said rotor such that said rotor will rotate with respect to said stators;

a disk connected to a second shaft and comprising a reflective coating, said reflective coating being in a sinusoidally varying pattern having one region of high reflectivity and one region of low reflectivity said pattern extending circumferentially around said disk an electro-optical sensor means associated with each said winding, each said sensor means comprising a light source for shining on said reflective coating of said disk, a light detector for reading the light reflected off said reflective coating of said disk and providing an output signal in proportion to the amount of light reflected off said reflective coating of said disk, and amplifier means for generating an energization signal for its associated winding according to the output signal of said light detector; and transmission means connected between said first shaft and said second shaft and adapted to cause said disk to rotate one complete rotation as an adjacent North-South pair of magnet poles of said rotor move past one stator pole.

2. A commutating system for a brushless dc motor, said system comprising:

multiple magnet rotor mounted to a shaft for rotation thereon, said multiple magnet rotor comprising an altering North-South pole configuration;

a plurality of stators each comprising two poles and an associated winding disposed about said rotor such that said rotor will rotate with respect to said stators;

a disk connected to said shaft and comprising a reflective coating, said reflective coating being in a cyclically repeating sinusoidally varying pattern having regions of high reflectivity and corresponding regions of low reflectivity, said pattern extending circumferentially around said disk, an electro-optical sensor means associated with each said winding, each said sensor means comprising a light source for shining on said reflective coating of said disk, a light detector for reading the light reflected off said reflective coating of said disk and providing an output signal in proportion to the amount of light reflected off said reflective coating of said disk, and amplifier means for generating an energization signal for its associated winding according to the output signal of said light detector;

wherein the number of cycles of said sinusoidally varying pattern is selected such that each said light detector reads light reflecting off one complete cycle of said sinusoidally varying pattern for each movement of an adjacent North-South pair of magnetic poles of said rotor past one stator pole.

* * * * *

UNITED STATES PATENT AND TRADEMARK OFFICE
CERTIFICATE OF CORRECTION

PATENT NO. : 5,177,393

DATED : 1/5/93

INVENTOR(S) : Gary Webber

It is certified that error appears in the above-identified patent and that said Letters Patent is hereby corrected as shown below:

Claim 1, column 7, line 51, there should be a comma after the second occurrence of the word "reflectivity";

Claim 1, column 8, line 2, there should be a semi-colon after the word "disk"; and Claim 2, column 8, line 23, the word "altering" should be -- alternating --.

Signed and Sealed this

Second Day of November, 1993

Attest:

BRUCE LEHMAN

Attesting Officer

Commissioner of Patents and Trademarks